Sept. 26, 1939.  R. E. CONYNE ET AL  2,174,122
BALANCE STAFF
Filed June 20, 1938
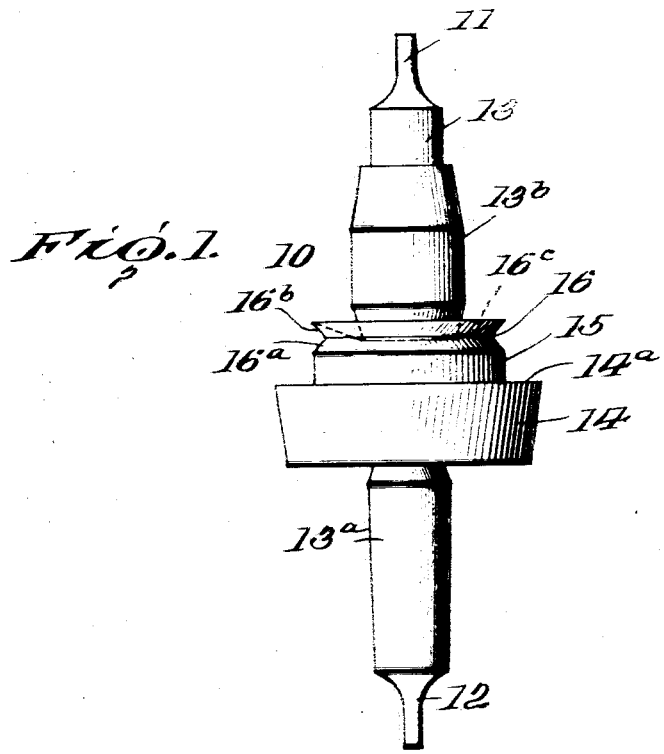
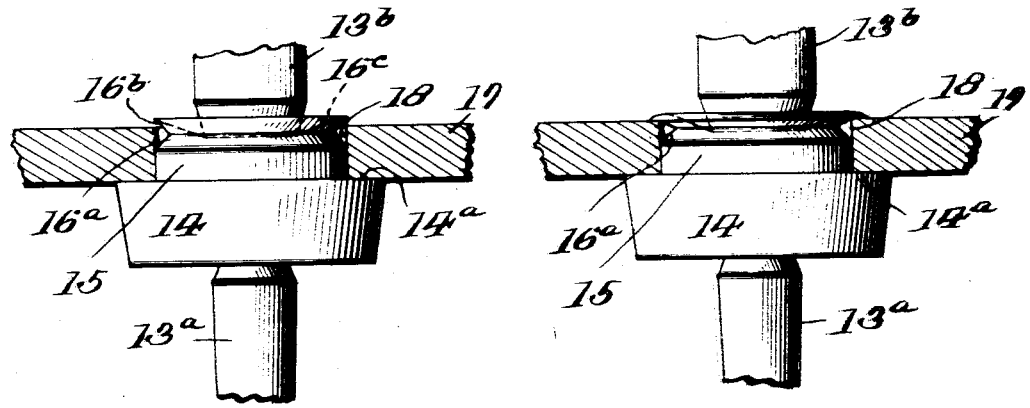
Inventor
Russell E. Conyne
Thomas P. Dolby
By Mason + Porter
Attorneys

UNITED STATES PATENT OFFICE 2,174,122

BALANCE STAFF

Russell E. Conyne and Thomas P. Dolby, Elgin, Ill., assignors to Elgin National Watch Company, Elgin, Ill., a corporation of Illinois Application June 20, 1938, Serial No. 214,795

5 Claims. (Cl. 58—140)

The present invention relates to new and useful improvements in balance staffs for watches, and to improvements in the connection between the staff and the balance.

In the manufacture of watches, it is essential that the balance arms or wheels run absolutely true "in the round" and "in the flat". Thus, in securing the balance arm to the balance staff, it is necessary to provide a connection which will insure a true running of the balance. Balance staffs for watches are necessarily small because of the limited space available. Such balance staffs are subject to breakage during the original assembly of the watches and also during normal operation of the watches. It is desirable, therefore, to secure the staff to the balance in such a manner that a broken or damaged staff can be readily removed and replaced without distorting the balance arm.

Heretofore, it has been customary to provide an apertured balance arm or wheel and to secure a hub or collet in the aperture by a staking or riveting operation. The balance staff has then been assembled in the hub or collet in various ways. It has also been proposed to provide a balance staff with an integral hub which is adapted to be secured in the aperture in the balance arm. Thus, the staff has been located within the aperture in the balance arm with the hub positioned so that it may be secured to the balance arm by riveting or staking. In securing a staff to the balance arm in this manner, it has been found that the riveting operation often results in a swelling in the hub, and this swelling causes a distortion of the balance arm around the aperture therein. This distortion of the metal in the balance arm disturbs the concentricity of the balance so that it will not run absolutely true. With this type of construction, it is also extremely difficult to remove a balance staff without distorting the balance arm. As pointed out above, it is desirable to provide a connection between the balance arm and the balance staff, which will permit replacement of damaged staffs without distortion of the balance arm. Furthermore, the usual riveting operation for securing the balance hub to the balance arm requires a substantial amount of pressure, and this necessarily results in considerable wear and resultant damage to the operating or assembling tools.

The present invention aims to overcome the above mentioned difficulties and contemplates the provision of a balance staff which may be secured to a balance arm with a minimum amount of pressure, thus saving wear on the assembling tools.

A further object of the invention is to provide a balance which is secured to the balance arm in such a manner that the staff may be removed and replaced by a new staff without distorting the balance arm, thus facilitating the assembly or replacement in watches.

A still further object of the invention is to provide a balance staff of the type which includes an integral hub adapted to be inserted within the aperture in the balance arm and a flange portion adapted to engage the upper surface of the balance arm for securing the parts together.

A still further object of the invention is to provide a balance staff of the above type, wherein the hub is circumferentially grooved to form a substantially radial flange portion adapted to be forced into contact with one surface of the balance arm with the requirement of a minimum amount of pressure.

A still further object of the invention is to provide a balance staff of the above type, wherein the flange portion is disposed slightly above the surface of the balance arm when the parts are assembled so that it may be readily forced against the upper surface thereof without distorting or enlarging the aperture therein.

The above and other objects of the invention will in part be obvious and will be hereinafter more fully pointed out.

In the accompanying drawing,

Figure 1 is an enlarged side elevation showing the improved balance staff.

Figure 2 is a fragmentary side view, partly in section, showing the manner in which the balance staff is originally positioned within the aperture in the balance arm.

Figure 3 is a view similar to Figure 2, showing the manner in which the balance staff is finally secured to the balance arm.

Referring more in detail to the accompanying drawing, the balance staff 10 is illustrated in Figure 1. This balance staff is provided with the usual end pivots 11, 12 which are joined by upper and lower shaft portions 13, 13a and an intermediate enlarged annular flange 14. The upper shaft portion 13 is provided with an enlarged offset portion 13b and a hub portion 15 which is disposed between the portion 13b and the annular flange 14. The enlarged flange portion 14 is thus disposed between the hub portion 15 and the lower shaft portion 13a and provides an upper horizontal shoulder or bearing surface 14a immediately around the bottom of the hub portion 15 which is illustrated as being cylindrical although it may be of any desired shape, depending upon the shape of the opening in the balance.

As indicated above, the hub portion 15 includes a lower cylindrical portion and an upper grooved portion 16. The groove 16 extends peripherally around the hub portion 15 and is defined by inwardly tapered walls 16a, 16b. The hub portion 15 is recessed or dished around the enlarged offset portion 13b, as shown at 16c, and the downwardly and inwardly extending wall portion 16b provides a retaining flange which extends substantially radially or laterally therefrom and the purpose of this construction will be hereinafter pointed out.

A portion of the balance arm or wheel 17 is shown in section in Figures 2 and 3 and may be of any suitable type. The balance arm is provided with a central aperture 18 having a diameter equal to the external diameter of the lower cylindrical portion of the hub 15. Thus, as shown in Figure 2, the balance staff may be inserted through the opening 18 in the balance arm and positioned so that the lower cylindrical portion of the hub 15 will snugly fit within the aperture in the balance arm. In this position, the balance arm 17 rests upon the horizontal shoulder 14a which is provided by the enlarged annular flange.

When the parts are first assembled, as shown in Figure 2, the retaining flange 16b will pass through the aperture in the balance arm. When the balance arm rests on the shoulder 14a, the free edge of the retaining flange 16b will be disposed slightly above the upper surface of the balance arm.

In order to secure the balance staff to the balance arm after the parts have been positioned, as shown in Figure 2, the retaining flange 16b is staked or riveted so that it will engage the upper surface of the balance arm, as shown in Figure 3. The groove 16 thus provides a space between the balance arm and the balance staff permitting a slight expansion of the metal during the staking or riveting operation so as to prevent the hub 15 from distorting the metal of the balance arm 17 around the aperture 18. A comparatively small amount of pressure is necessary to effect the clamping of the retaining flange 16b against the upper surface of the balance arm 17, but the balance arm is securely held between the flange 16b and the shoulder 14a.

From the foregoing description, it will be readily seen that the groove 16 is disposed substantially at or below the upper surface of the balance arm 17. Thus, the retaining flange portion 16b extends above the balance arm 17, as shown in Figure 2. In riveting the hub portion, the retaining flange 16b will be pressed downwardly and outwardly by a substantially downward pressure to engage the upper surface of the balance arm 17, as shown in Figure 3. The groove in the hub portion provides a limited annular space between the hub portion and the balance staff around the aperture therethrough, thus permitting slight expansion of the metal in this region without distorting the aperture in the balance arm. While the balance arm 17 is securely held between the retaining flange 16b and the shoulder 14a, still the relatively thin retaining flange permits the removal of staffs without damaging the aperture 18 in the balance arm due to the ease with which the flange may be broken loose by a punching operation. Thus, a substantial saving in the manufacture of watches is effected in that the replacement of damaged staffs is readily effected without damage to the balance arm. A similar saving in time and expense is afforded to the watch maker in repairing broken staffs.

Furthermore, with a grooved integral hub portion on the balance staff, a great deal less pressure is required to effect the riveting operation. Thus, wear and damage to the burnishing tools are reduced. The concentricity of the aperture in the balance arm is maintained during the assembling operation and also when broken staffs are removed and replaced with new ones. Thus time and expense are saved in that the balance arms do not have to be trued after each replacement operation.

It is to be clearly understood that various changes in the details of construction and arrangement of parts may be made without departing from the scope of the invention as set forth in the appended claims.

We claim:

1. A watch balance staff to which an apertured balance is adapted to be connected, including an integral annular shoulder on which one face of the balance arm is adapted to rest, an integral hub portion snugly fitting within the aperture in the balance arm, and said hub portion having a peripheral groove providing an integral flange portion adapted to overlie and engage the opposite face of the balance arm.

2. A watch balance staff to which an apertured balance is adapted to be connected, including an integral annular shoulder on which one face of the balance arm is adapted to rest, an integral hub portion snugly fitting within the aperture in the balance arm, and said hub portion having a peripheral groove slightly below the opposite face of the balance arm for providing an integral flange portion disposed above and adapted to overlie and engage the opposite face of the balance arm.

3. A watch balance mechanism comprising a balance arm having an aperture therethrough, a balance staff extending through the aperture in said balance arm and including an integral hub portion snugly fitting within the said aperture, said hub portion having at one end thereof a peripheral groove providing a retaining flange overlying and engaging one face of the balance arm around the aperture therethrough, and means on said balance staff providing a shoulder against which the opposite face of the balance arm is adapted to press.

4. A watch balance mechanism comprising a balance arm having an aperture therethrough, a balance staff extending through the aperture in said balance arm and including an integral hub portion snugly fitting within said aperture, and means on said balance staff providing a shoulder against which one face of the balance arm is adapted to rest, said hub portion having a peripheral flange extending substantially radially from an adjacent portion thereof but of a size permitting the passage of the flange through the aperture in said balance, said flange being disposed above the balance arm whereby a substantially downward pressure on the flange will cause its engagement with the opposite face of the balance arm without distortion of the balance arm.

5. A watch balance staff to which an apertured balance is adapted to be connected, including an integral annular shoulder on which one face of the balance arm is adapted to rest, an integral hub portion having the lower part thereof snugly fitting within the aperture in the balance arm and having an integral peripheral flange at the upper part thereof extending substantially radially therefrom but not beyond the lower part of the hub portion, said flange being adapted to overlie and engage the opposite face of the balance arm.

RUSSELL E. CONYNE.
THOMAS P. DOLBY.